No. 711,611. Patented Oct. 21, 1902.
A. ADELBERG.
MEASURING AND DRAFTING DEVICE FOR GARMENTS.
(Application filed Aug. 27, 1901.)
(No Model.) 3 Sheets—Sheet 1.
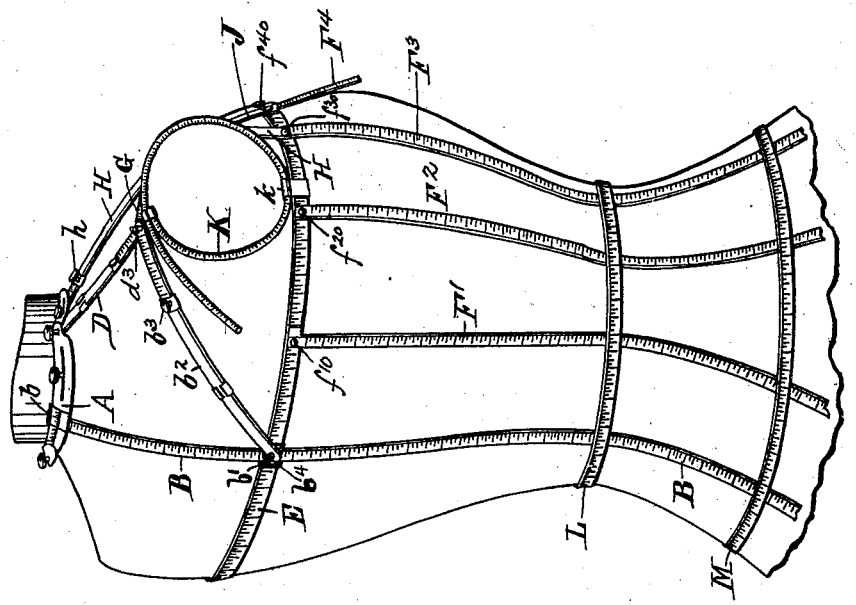
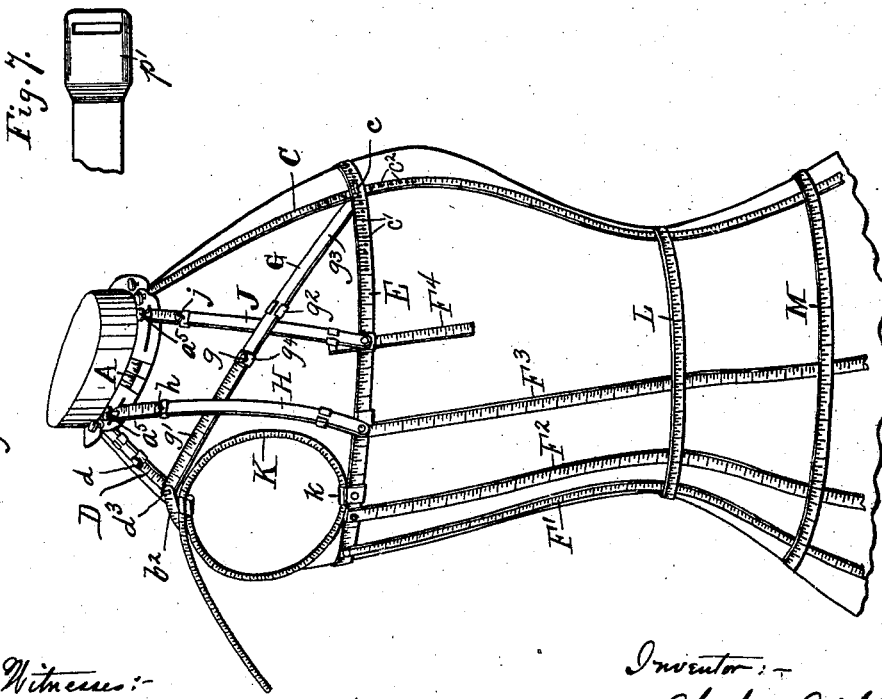
Witnesses:—
Katharine R. Spencer.
F. Bissell
Inventor:—
Abraham Adelberg
by Osgood & Davis
his Attys

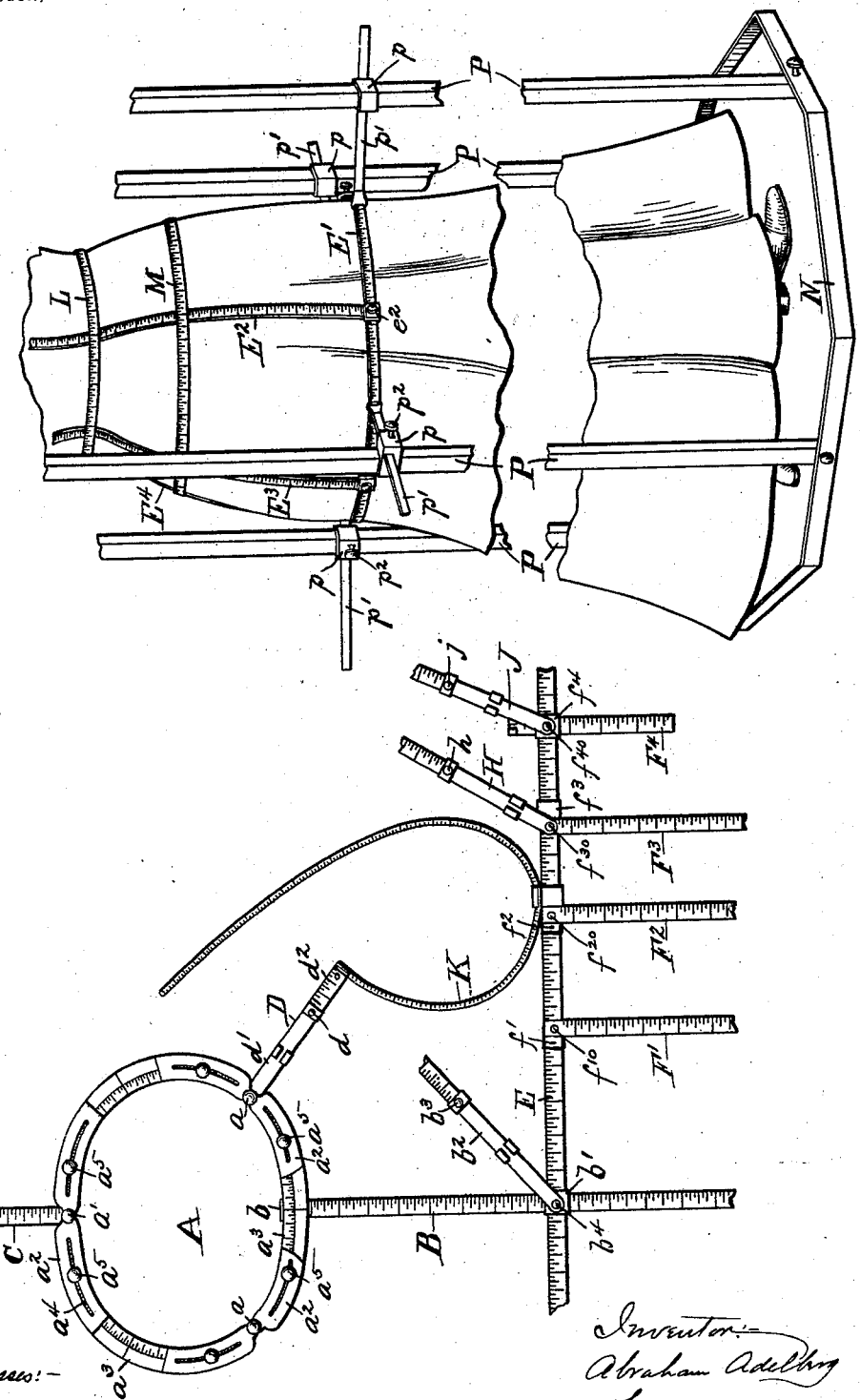

No. 711,611. Patented Oct. 21, 1902.
A. ADELBERG.
MEASURING AND DRAFTING DEVICE FOR GARMENTS.
(Application filed Aug. 27, 1901.)
(No Model.) 3 Sheets—Sheet 3.

UNITED STATES PATENT OFFICE.

ABRAHAM ADELBERG, OF ROCHESTER, NEW YORK.

MEASURING AND DRAFTING DEVICE FOR GARMENTS.

SPECIFICATION forming part of Letters Patent No. 711,611, dated October 21, 1902.

Application filed August 27, 1901. Serial No. 73,463. (No model.)

*To all whom it may concern:*

Be it known that I, ABRAHAM ADELBERG, a citizen of the United States, and a resident of Rochester, in the county of Monroe and State of New York, have invented certain new and useful Improvements in Measuring and Drafting Devices for Garments, of which the following is a specification.

This invention relates to measuring and drafting devices for garments; and it consists in the apparatus hereinafter described and claimed.

Figure 4:
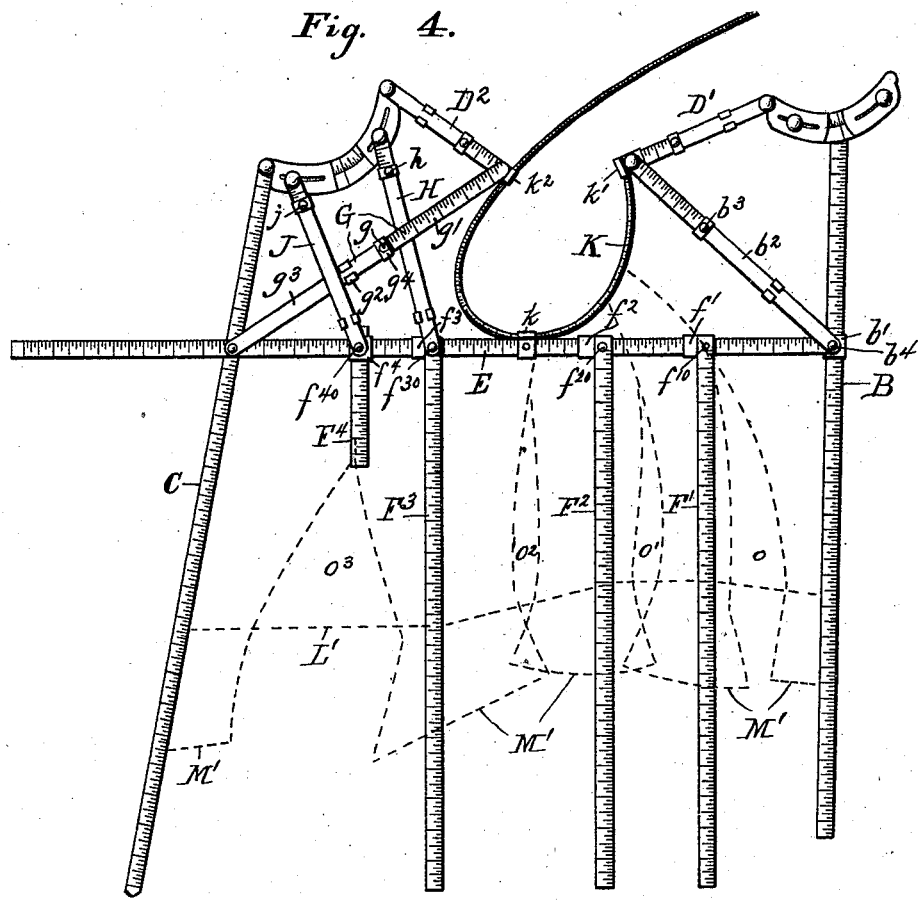
Figure 6:
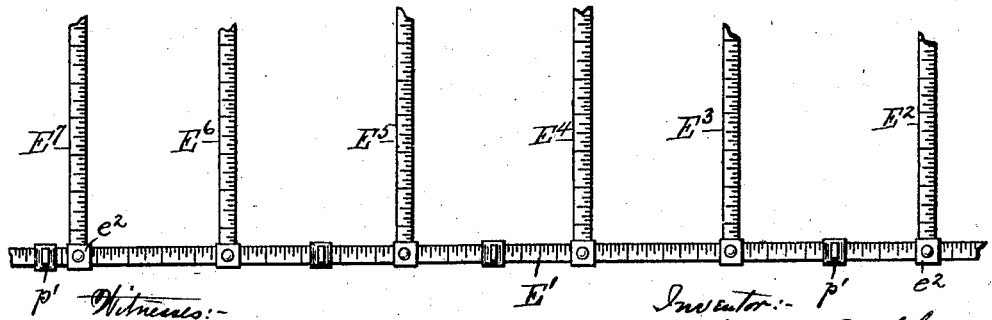

In the drawings, Figure 1 is an elevation, from one point of view, of my apparatus as applied to the trunk of a figure. Fig. 2 is an elevation of the same from another point of view. Fig. 3 is a plan view of the same apparatus laid flat, portions being omitted to save space. Fig. 4 is a plan view of my apparatus laid flat and when used for drafting. Fig. 5 is an elevation of my apparatus as applied to measuring a skirt. Fig. 6 is a view of the measuring apparatus shown in Fig. 5, and Fig. 7 is a plan view of an end of one the rods attached to one of the standards of my skirt-measuring device.

The principal invention on which my apparatus is based is to make use of a base-line around the figure of the person whose garment is to be drafted and to measure from said base-line in lines set in planes at right angles to the plane cutting said base-line. For instance, a steel base-tape is passed around the bust of a person to be measured, and thereto are slidingly attached a series of other tapes always maintaining a position at right angles to the base-tape. If these tapes (herein called the "vertical tapes," although not necessarily vertical) are drawn in at the waist of the figure, it is obvious that they will be closer together at the waist than at the bust by just so much as the circumference of the waist is less than that of the bust and that the said tapes will expand again over the hips of the figure. (See Figs. 1 and 2.) If now the measurement is taken around the waist and the distances of the vertical tapes from each other are measured and the like is done at the hips and then the instrument is taken from the figure and laid flat, the vertical tapes become parallel and the exact shape and location of the gores, darts, &c., can be determined by subtracting from between said vertical tapes the amount of difference between their distances when parallel and the measurements taken on the figure. This system is of universal application to the measurement of figures and the drafting of garments therefrom, and it is to this general feature that this specification is particularly directed. Other measurements may be taken as desired, and apparatus suited for retaining the base-line in its proper position is of course an adjunct to the main idea. The measurement of the neck and of the portion of the figure and garment between the neck-line and said bust-line is effected by the same method. A collar adapted to be set around the neck and to contact and expand for necks of different sizes has attached to it a tape which must always stand in a plane at right angles to the plane of the collar. This tape is attached with others to the base-tape which goes around the bust and to the collar, thus forming a secondary base-tape for measurement of the upper part of the figure. The same method is employed for measuring that portion of the figure and for drafting that portion of a skirt extending from the waist downward and which is required to fit with reasonable closeness. The number of vertical tapes at right angles to the base-tape may vary according to the number of gores that are to be removed or omitted from the waist or skirt pattern. I prefer to use a number of tapes so corresponding to the number of gores that there shall be one gore between two tapes.

I describe first the instrument as I prefer to use it for measuring the trunk of a body or for a waist or jacket. This is shown in Figs. 1, 2, and 3. A collar A is provided, consisting of a series of flat curved sections of suitable material, such as brass or steel. In Fig. 3 it is composed of three main sections connected by hinges or pivots $a$ $a$ $a'$. Each of these sections consists of three parts, as shown, $a^2$ $a^2$ $a^3$, which by means of slots $a^4$ in the sections $a^2$ and set-screws $a^5$, passing through the slots $a^4$ and fastened to the sections $a^3$, hold the parts together, so that the whole collar may be expanded or contracted to fit around the neck of any individual. In order to measure the circumference of the neck and to determine the front and back middle lines of the waist and of the shoulder positions, the sections are graduated so that the position of each section may be determined. Graduations are made, preferably, on the middle sections $a^3$, so that the side sections $a^2$ may be set independently at variable distances from a middle line on the section $a^3$. This is important often, because, for instance, a person with a long thin shoulder must have the section $a^2$ nearest the shoulder more extended than the other section $a^2$ of the same triplet of parts. To one of the sections $a^3$ is attached a stiff yet flexible measuring-tape B, that is hinged at $b$ to said section $a^3$ so as always to maintain a position in a plane at right angles to the plane of the collar A, which first plane passes also through the center of the collar A. The tape B is for measuring the vertical middle line of the back of the waist. (See Fig. 2.) To the pivot $a'$, whereby the collar may be opened and shut to place it around the neck of the figure to be measured, is pivotally attached the flexible yet stiff tape C, which is for the purpose of measuring the middle front line of the figure, as shown in Fig. 1, and to one of the pivots $a$ is pivotally attached a slidingly-extensible measure D, provided with a scale and with a set-screw $d$, whereby the two extensible sections $d'$ and $d^2$ of this scale may be fastened at any suitable degree of extension or contraction. This measure D is for the purpose of determining the position and length of the shoulder-seam. Upon the tape B is a sliding collar $b'$, through which also passes at right angles to the tape B a similar tape E. The tapes B and E both slide through the collar $b'$, and to this collar is pivoted an extensible two-section measuring-tape $b^2$, having a set-screw $b^3$ and used for a purpose hereinafter described. The tape B is long enough to pass down the back of the figure from the collar to and over the hips thereof. Upon the tape E is set a series of collars $f'$, $f^2$, and $f^3$, adapted to slide longitudinally on the tape E and to which are attached a series of vertical tapes $F'$, $F^2$, and $F^3$. More or less of these vertical tapes may be employed in any case, as may be desired. The more that are used the more accurate will be the fitting of the garment for the measured figure. The collars to which these vertical tapes $F'$ $F^2$ $F^3$ are attached are adapted to slide on the tape E and are permanently and not pivotally attached to the vertical tapes, so that said vertical tapes, as well as the tape B, must always take a position in planes at right angles to the plane of the tape E whether the tape E be curved or flat. For women's figures another tape $F^4$ passes through a collar $f^4$, that fits and slides on the tape E. The tape $F^4$ may slide vertically through said collar, but is always maintained at right angles to the tape E. This last tape $F^4$ is used for obtaining the position of the most prominent portion of the figure in order to determine the position of the upper end of the dart. Set-screws $f^{10}$ $f^{20}$ $f^{30}$ $f^{40}$ fasten the collars of the tapes $F'$ $F^2$ $F^3$ $F^4$ at the desired positions on the tape E. In order to maintain the different parts in proper place on the bust, slidingly-extensible tapes provided with set-screws and of the same character as those described with reference to the shoulder-tape D may be provided as follows: The tape $b^2$, running from the intersection of the bust or base tape E with the back tape B to a point at or near the outer end of the shoulder-tape D, is fastened thereto by means of a pin $d^3$, adapted to pass through a perforation in the end of the tape $b^2$. On extending or contracting the tape $b^2$ and setting its set-screw $b^3$ the shoulder-line tape D may be accurately set, and a similar tape G, attached to the intersection of the front tape C with the base or bust tape E, extends to and by a perforation in its end sets over the pin $d^3$ on the end of the shoulder-tape. In this way the height and position of the shoulder-tape D is accurately determined. The tape E is supported at its proper height from the collar A by the back tape B, the set-screw $b^4$, the front tape C, and a pin $c$ or other fastening for connecting the tape G, the tape C, and the tape E. Other tapes, if desired, may be employed, such as the tape H and the tape J, each extending from one of the collars on the tape E—as, for instance, that carrying the tape $F^3$ to one of the set-screws, such as $a^5$, on the collar-piece A close to the shoulder-tape D. The tape J may run from the collar $f^4$, carrying the tape $F^4$, upward to one of the set-screws, such as $a^5$, close to the point of attachment of the front tape C with the collar A. The tapes $b^2$, H, and J are of the same extensible character hereinbefore described and are provided with set-screws $b^3$, $h$, and $j$ and have graduations, as shown, so that the degree of extension or contraction can be accurately recorded. To the end of the shoulder-tape D is fastened one end of a flexible measuring-tape K, fastened at one end to the end of the shoulder-tape and passing through a collar $k$, that slides on the tape E. The measuring-tape K is preferably cylindrical and is made conveniently of a suitable india-rubber or gutta-percha tube, having a stiffening material through its bore, such as a piece of whalebone or spring-wire, whereby this tape can be bent in circular directions, but cannot be elongated. This may be called the "armhole-tape." It is graduated, as are the others. In order to measure the trunk of the figure, the tapes $b^2$ and G are lifted from the pin $d^3$ and the collar is opened at the set-screw $a'$. The measuring device is then placed upon the figure, with the arm resting in the armhole-tape K, and the collar is expanded or contracted and then is fastened around the neck, being adjusted thereon at the desired angle. The tape B is then set in the desired middle line of the back, the collar $k$ is shifted on the tape E until the line of the armhole is adjusted with reference to the middle of the back, and then the tape E is set around the figure, the two ends being fastened by any suitable fastening. The height of the bust or base tape E is then properly adjusted on the back tape B and the front tape C, which last tape is adjusted to the middle line of the front of the figure. Then, dependent upon the desired position of the gores and of the dart, the tapes $F'$, $F^2$, $F^3$, and $F^4$ are shifted sidewise on the tape E until their desired positions are reached. Then the tapes $b^2$ and G are fastened on the pin $d^3$ and are extended or contracted and are fastened by their respective set-screws, so as to hold the intersections of the front and back tapes with the bust or base tape E in definite positions. Then the tapes H and J are fastened to their set-screws in the collar, being extended or contracted to suit the figure. The tape $F^4$ is raised or lowered until its lower end or its zero-graduation corresponds with the most prominent portion of the bust. Thus all the parts are in position for measurement. Now an ordinary tailor's tape-measure L is placed around the waist of the figure and another similar tape-measure M is placed around the hips in a line indicating the lower edge of the waist or jacket or the lowest point where the waist or jacket must fit the figure closely. These tapes L and M are fitted closely over the series of downwardly-projecting steel tapes B, $F'$, $F^2$, $F^3$, and C, so as to draw in said steel tapes evenly and without sidewise flexing. The overlapping ends of the tapes L and M are then fastened by means of clips or pins in any suitable manner for holding the parts in the position shown in Figs. 1 and 2. Now the readings are taken from the various scales and the distances from each other of the tapes B, $F'$, $F^2$, $F^3$, and C and are recorded. This device I have shown as applied only to half of a figure—viz., the right-hand side thereof. The device may, however, be made double, so as to measure all points on both sides of the figure, which in many cases is desirable, and in all cases where extremely-accurate fitting is desired a double-sided measuring device is employed; but it is not thought necessary to show it or to describe it particularly herein, because the two sides will correspond exactly with each other. I may employ this particular device for drafting the garment; but I prefer to use a modified form. (Shown in Fig. 4.) In this the shoulder-tape D instead of being single is made double, as indicated by $D'$ $D^2$, and the armhole-tape K is permanently fastened at $k'$ to the end of one of these shoulder-tapes, as $D'$, and passes through the collar $k$ on the base or bust tape E and thence through the collar $k^2$ on the end of the other shoulder-tape, as $D^2$. By means of graduations on the various tapes and parts the drafting instrument shown in Fig. 4 may be set to correspond in all its positions with the respective positions of the parts of the measuring instrument shown in Figs. 1, 2, and 3 and is then laid flat on the cloth or paper on which the garment is to be drafted. The dotted line $L'$ is the position of the tape L at the waist. The lower lines $M'$ correspond to the position of the tape M upon the hips. It is obvious that from the bust diameter to the waist there must be a properly-graduated reduction in size for the waist, and this in actual garments is produced by cutting the parts so as to have the effect, actual or apparent, of removing triangular pieces from the pattern or cloth. In the instance shown the vertical tapes $F'$, $F^2$, and $F^3$ are so arranged on the figure that gores $o$ $o'$ $o^2$ and a dart $o^3$ are, as it were, removed from the cloth, the gore $o$ being between the back tape B and the first vertical tape $F'$, the second gore $o'$ being between the tapes $F'$ and $F^2$, the third gore $o^2$ being between the tapes $F^2$ and $F^3$, and the dart $o^3$ being between the vertical tape $F^3$ and the front tape C. If the bust measurement was forty inches and the waist measurement was twenty-six inches and the distances between the vertical tapes was, in inches, as follows: B to $F'$, bust, four and one-fourth, waist, two and one-half; $F'$ to $F^2$, bust, three and one-half, waist, two and three-fourths; $F^2$ to $F^3$, bust, four and one-fourth, waist, three and one-half, and $F^3$ to C, bust, eight, waist, four and one-fourth and then the measuring device or the drafting instrument correspondingly set is laid upon the pattern, the amounts to be taken out at the waist-line for the gores and darts are for the gore $o$ at the waist-line, one and three-fourths inches; for the gore $o'$, three-fourths of an inch; for the gore $o^2$, three-fourths of an inch, and for the dart $o^3$, three and three-fourths inches. The upper end of the dart is determined by the selected point in the scale on the tape $F^4$. The distances of the different points in the waist-line from the bust or base tape E is of course determined by vertical heights on the tapes B, $F'$, $F^2$, $F^3$, and C, and on the waist-line $L'$ in the pattern or garment are marked the amounts to be taken out for the lower ends of the gores and darts. So, too, the hip measure is laid out in like manner, it being necessary to adjust, however, the lower edges $M'$ in a manner well known to garment-cutters. The total lengths of the edges $M'$ of course are made equal to the total circumference of the hips shown by the measure M. (See Figs. 1 and 2.) In drafting I find it convenient to draw a line at right angles to the tape E, and therefore parallel to the tapes B $F'$ $F^2$ $F^3$, from the intersection of the tapes E and C and to base the amount to be taken out for the dart by the difference between the bust measure and the waist measure, as if the line was represented by an actual vertical tape. The amounts to be taken out on the waist-line being marked on the pattern and being set substantially intermediate between the tapes, it is possible, by means of flowing curves, to determine accurately the positions of the edges of the gores and darts, as shown in Fig. 4. While the measuring instrument is on the body, the armhole may be measured by the tape K, so as to determine accurately the length of the curve from the shoulder-tape to the collar $k$ on both sides, and that tape being set in the drafting instrument by means of the graduations upon it, so that they correspond exactly, the shape of the armhole is accurately determined. So, too, the other distances from different points on the tape E to the collar and shoulder tapes are accurately determined, as is obvious from the drawings. The tape C does not stand at right angles to the tape E, and in Fig. 1 is thus shown. Its angularity with reference to the tape E of course determines its angularity with reference to the right-angle tapes B F' $F^2$ $F^3$ $F^4$, and the length of the extensible tape G determines this angularity.

The various tapes forming part of the measuring and drafting instrument are preferably made of steel or spring-brass, so as to be capable of inward and outward flexure when placed on the body in order to be capable of contraction about the waist-line; but being broad and thin and incapable of sidewise flexion for this reason they are rigid in one direction and flexible in another. In the drawings it is deemed unnecessary to show numerals on the graduations of the various tapes. The extensible tapes are all made in the same way of two pieces. In the case of the tape G, for instance, one piece $g'$ is graduated and has on its end a clip $g^2$, passing partly or entirely around the other section $g^3$. The section $g^3$ bears a collar $g^4$, passing wholly or partly around the tape $g'$, and a set-screw on the collar $g^4$ is adapted to clamp the sections $g'$ $g^3$ in any desired position of extension or contraction.

The device for measuring the skirt is more simple than that hereinbefore described, but is made upon the same principle and is of the same invention. In regard to the devices for measuring and drafting the waist or jacket the base-line is made around the bust by the tape E and is set approximately in a horizontal plane. For a skirt the base-line is also set in a horizontal plane, and special means are provided for so setting it, which special means may be used or not, as desired.

The skirt device, both for measuring and drafting, is shown in Fig. 6 and is shown in position on the customer in Fig. 5. It consists of the base-tape E' and the vertical tapes $E^2$, $E^3$, $E^4$, $E^5$, $E^6$, and $E^7$, (all being made of a material that is flexible and strong, such as steel or spring-brass,) each vertical tape being attached to a collar $e^2$, that fits and slides on the tape E', and which always has the tapes $E^2$ to $E^7$, inclusive, at right angles to the base tape E'. This tape E' being placed around a figure or over the skirt already in place, the tapes $E^2$ to $E^7$, both inclusive, extend upward and are held in at the hip and waist lines by the ordinary tailor's tape-measures L and M. If the base-tape E' is set in a horizontal position, it will of course be parallel to the floor, and the distance therefrom to the lower edge of the skirt, according to the fashion of the time, is easily determined; but in order to fit the figure closely over the hips and at the waist, I prefer to use such a number of vertical tapes $E^2$ to $E^7$ as that each gore to be taken out at the waist shall be between a pair of tapes. One tape, $E^2$, I prefer to set in the middle of the front and one tape—say $E^5$—at the middle of the back, thus leaving two tapes $E^3$ and $E^4$ and $E^6$ $E^7$ on each side of the body. In the present case there will be six gores to be removed or omitted in order that the skirt shall fit the figure. The circular measurement between the tapes $E^2$ to $E^7$, inclusive, will give the proper dimensions and the exact positions of the different gores, and will produce an accurate fitting of the garment without the tedious series of fitting heretofore made necessary by prior systems of cutting and means of measurement. In order to maintain the base-tape E' in the horizontal position, I prefer to use a framework, such as I will now describe, consisting of a suitable base N, having attached to it a number of vertical standards P P—not less than three, for instance. These standards are graduated, and on each of them fits and slides a collar $p$, and transversely movable in each of these collars is a rod $p'$. The rod and collar are conveniently fastened to the standard by means of a single set-screw $p^2$. The end of the rod $p'$ has a slot $p^3$, as shown in Fig. 7, that fits upon the tape E', and by this means the tape E' may be set accurately at a suitable height and in a horizontal position or otherwise, as may be deemed best. If the position of the tape E' is accurately determined, even though it may not be horizontal the cutting of the skirt can still obviously be made accurate. The setting of the collars $p$ upon the standards P of course determines the exact position of the tape E'. This tape E' is, like the tape E, a base-tape, and has the vertical tapes $E^2$ to $E^7$, both inclusive, maintained at right angles thereto, just like the tapes B to $F^3$, both inclusive, for measuring and drafting the waist or jacket.

In the device shown in Figs. 1 to 4, inclusive, the important and essential part is, as just suggested, the base-tape E and the vertical tapes B F' $F^2$ $F^3$, the remaining parts being properly considered adjuncts or additions thereto. Consequently the tapes E' and E are the same. The tapes B, F', $F^2$, and $F^3$ are the same as the tapes $E^2$ to $E^7$, differing only in number, which number depends entirely upon the number of gores to be taken out or measurements which the operator desires to take. With each of these devices any number, more or less, of the vertical tapes having collars adapted to slide on the base tape and to maintain the vertical tapes at right angles thereto may be provided and employed.

In the foregoing the term "bands" and "tapes" as employed with reference to the measuring and drafting instruments imply the use of such devices flexible inward and outward from the figure, but not flexible in sidewise directions. In other words, the tapes are flexible in the direction of their thickness, but not in the direction of their width. The collar A is preferably inflexible. The collar A, with its attachments to the tape or band E, is a supporting means for the band E and is used to determine the position of the plane of the band E with reference to the horizontal.

The apparatus shown in Fig. 6 is used also for determining the shape and size of the sleeves, as the steel or brass tape E' is very flexible. It may be used with two, three, or four of the vertical bands $E^2$ to $E^7$, and the tape E' may be placed around the elbow and measurements taken therefrom to the armhole-line, including the swell or looseness of the sleeve. The device is then turned around and measurements are taken from the elbow downward to the wrist, thus giving the exact dimensions of the sleeve-pattern. Two of the tapes in this use of the device of course extend along the normal seam positions and the other tapes determine the differences from parallelism and the amount to be taken out or omitted by the same method as has been described with reference to the waist.

What I claim is—

1. In a measuring and drafting instrument for garments, the combination of a graduated base-band having graduated vertical tapes each tape being adapted to slide longitudinally on the base-band and so connected thereto as always to be at right angles to said base-band, and supporting devices for determining the relation of the plane of the base-band when upon the figure with reference to the horizontal comprising a collar-piece consisting of graduated three-part sections, two of said parts adjustable with reference to a middle line on the middle or third part, one of said vertical tapes being connected at right angles to one of said middle or third parts, substantially as described.

2. In a measuring and drafting instrument for garments, the combination of a graduated base-band, having a series of collars adjustable longitudinally thereon, a series of graduated vertical tapes permanently attached to said collars whereby they are always maintained at right angles to said base-band, and supporting devices for determining the relation of the plane of the base-band when upon the figure with reference to the horizontal comprising a collar-piece consisting of graduated three-part sections, two of said parts adjustable with reference to a middle line on the middle or third part, one of said vertical tapes being connected at right angles to one of said middle or third parts, substantially as described.

3. In a device for measuring and drafting waists, jackets and the like, a rigid expansible collar-piece having graduations, a back band B attached thereto and at right angles thereto, a front band C attached thereto, a bust-band E attached at right angles to the band B and capable of motion thereon, a series of vertical tapes, as F', upon said bust-band E, adapted to slide on said bust-band and maintained at right angles thereto, the front band C being adapted to be attached also to said bust-band, and other expansible and contractible supporting-bands attaching said collar-piece to said bust-band E, substantially as described.

4. In a device for measuring and drafting waists, jackets and the like, a rigid expansible collar-piece having graduations, a back band B attached thereto and at right angles thereto, a front band C attached thereto, a bust-band E attached at right angles to the band B and capable of motion thereon, a series of vertical tapes, as F', upon said bust-band E adapted to slide on said bust-band and maintained at right angles thereto, the front band C being adapted to be attached also to said bust-band, and other expansible and contractible supporting-bands attaching said collar-piece to said bust-band E and an expansible and contractible shoulder-band attached to and extending from said collar-band, substantially as described.

5. In a device for measuring and drafting waists, jackets and the like, a rigid expansible collar-piece having graduations, a back band B attached thereto and at right angles thereto, a front band C attached thereto, a bust-band E attached at right angles to the band B and capable of motion thereon, a series of vertical tapes, as F', upon said bust-band E, adapted to slide on said bust-band and maintained at right angles thereto, the front band C being adapted to be attached also to said bust-band, other expansible and contractible supporting-bands attaching said collar-piece to said bust-band E, an expansible and contractible shoulder-band attached to and extending from said collar-band, and a graduated armhole-band attached to the shoulder-band and passing through a sliding collar on the bust-band E, substantially as described.

6. In a measuring and drafting device for garments, a collar-piece A consisting of three parts, a back portion and two side portions; a bust-band E, a back band B, and a front band C, each connecting the collar-band with said bust-band; an arm-band K, shoulder-seam mechanism connecting said arm-band with said collar, and supporting-bands J and H connecting the bust-band with said collar-band, substantially as described.

7. In a measuring and drafting device for garments, a collar-piece A consisting of three parts, a back portion and two side portions; a bust-band E, a back band B, and a front band C each connecting the collar-band with said bust-band; an arm-band K, shoulder-seam mechanism connecting said arm-band with said collar, supporting-bands J and H connecting the bust-band with said collar-band, and diagonal bands connecting the outer end of the shoulder-seam mechanism with the intersection of the front and back bands with said bust-band, substantially as described.

ABRAHAM ADELBERG.

Witnesses:
NELSON E. SPENCER,
F. BISSELL.